United States Patent
Prysby et al.

(10) Patent No.: US 6,888,878 B2
(45) Date of Patent: May 3, 2005

(54) SIGNAL COMBINING WITHIN A COMMUNICATION SYSTEM

(75) Inventors: Daniel G. Prysby, Elk Grove Village, IL (US); Stefan Paun, Park Ridge, IL (US); Joseph L. Suttie, III, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 789 days.

(21) Appl. No.: 09/804,602

(22) Filed: Mar. 12, 2001

(65) Prior Publication Data

US 2002/0126745 A1 Sep. 12, 2002

(51) Int. Cl.$^7$ .................................................. H04B 1/69
(52) U.S. Cl. ....................................................... 375/148
(58) Field of Search ............................... 375/147, 148, 375/130, 316, 346, 347, 140, 144

(56) References Cited

U.S. PATENT DOCUMENTS

| 6,125,137 A | * | 9/2000 | Wang et al. ................. 375/148 |
| 6,215,814 B1 | * | 4/2001 | Ylitalo et al. ................ 375/148 |
| 2002/0106008 A1 | * | 8/2002 | Guey .......................... 375/148 |

FOREIGN PATENT DOCUMENTS

KR 2002057594 A * 7/2002 ............ H04B/1/69

* cited by examiner

Primary Examiner—Kevin Burd
(74) Attorney, Agent, or Firm—Kenneth A. Haas; Jeffrey K. Jacobs

(57) ABSTRACT

A method and apparatus for signal combining within a communication system is provided herein. The output of RAKE fingers is combined via a chip combiner. The combined chip stream can be despread with the appropriate Walsh code (defining a particular channel). The resulting symbol stream can then be deinterleaved and decoded.

14 Claims, 6 Drawing Sheets

SIGNAL COMBINING WITHIN A COMMUNICATION SYSTEM

FIELD OF THE INVENTION

The present invention relates generally to signal reception and in particular, to a method and apparatus for combining multiple scattered signals received within a communication system.

BACKGROUND OF THE INVENTION

In a cellular environment, transmitted signals undergo multipath scattering. In particular, a signal transmitted by a base station/remote unit undergoes multiple reflections before being received at a receiver, and these reflections cause "echoes" (or copies) of the transmitted signal to be received by the receiver along with a non-reflected (or "prompt") component. These echoes are generally of different amplitudes and different time delays, and therefore cause received signals to actually consist of a multiplicity of signals (the actual signal and its echoes), each having a different amplitude, angle of arrival, and time delay. In typical spread-spectrum communication systems a RAKE receiver is utilized to lock onto each of the several multipath rays of a received signal with individual RAKE "fingers." The receiver then combines fingers together to form a demodulated information stream. Internal to the RAKE receiver a "searcher" (or search processor) will have knowledge of the time offsets and pilot power for each finger.

FIG. 1 shows a prior-art receiver 100 for receiving multipath signals. As shown, signal 102 enters RAKE fingers 101 and 103 of receiver 100 where Pseudo Noise (PN) despreaders 107 and 109 despread signal 102 to form multiple despread signals. As discussed above, signal 102 comprises a coded (spread) signal which has undergone multipath scattering over various communication paths. After despreading with the appropriate PN code, a chip stream results. The chip stream is further despread via Walsh despreaders 111 and 113 into a symbol stream representative of that channel data. After appropriate time correction (115, 117) and phase correction (119, 121), the resulting symbols are summed and passed to the remaining channel circuitry which consists of deinterleaver 125 and decoder 127. Although only one channel is shown, in actuality, a multiplicity of channels exist which requires, for each RAKE finger, a Walsh despreader, time correction and phase correction for each channel.

Because the symbol streams from each of the fingers are added together to form a combined symbol stream, the gains of diversity combining can be achieved for multipath signal reception. A problem exists, however, in that Code Division Multiple Access (CDMA) RAKE receivers must time and phase correct each channel's symbol stream for all fingers prior to combining. This requires complex hardware, the complexity of which being related to the number of channels currently being decoded by the receiver and the number of RAKE fingers being combined. Additionally, when multiple antennas are utilized to receive a scattered signal, the need to weight and combine multiple antennas along with independent PN despreading of data samples for each finger requires very high rate processing. Therefore, a need exists for a method and apparatus for combining multiple scattered signals that is less complex than prior art methods.

DETAILED DESCRIPTION OF THE DRAWINGS

To address the above-mentioned need, a method and apparatus for signal combining within a communication system is provided herein. In accordance with the preferred embodiment of the present invention the output of RAKE fingers is combined via a chip combiner. The combined chip stream can be despread with the appropriate Walsh code (defining a particular channel). The resulting symbol stream can then be deinterleaved and decoded.

By combining multipath components of the transmitted signal at the chip level, no need exists for the complexities of combining at the symbol level. Therefore, the gains of diversity combining can be achieved for multipath signal reception without the need for symbol combining.

The present invention encompasses a method for signal combining within a communication system. The method comprises the steps of receiving a first signal at a first finger of a receiver, receiving a second signal at a second finger of the receiver, generating a first chip stream from the first signal, and generating a second chip stream from the second signal. The first and the second chip streams are then combined to produce a combined chip stream.

The present invention also encompasses a method for signal combining. The method comprises the steps of receiving a first chip stream, wherein the first chip stream has been despread with a Pseudo Noise (PN) code, receiving a second chip stream, wherein the second chip stream has been despread with the PN code, and combining the first and the second chip streams to produce a combined chip stream.

The present invention additionally encompasses a receiver comprising a first finger path having a first signal as an input and outputting a first chip stream, a second finger path having a second signal as an input and outputting a second chip stream, and a chip combiner having the first and the second chip steams as an input and outputting a combined chip stream.

Figure 2:
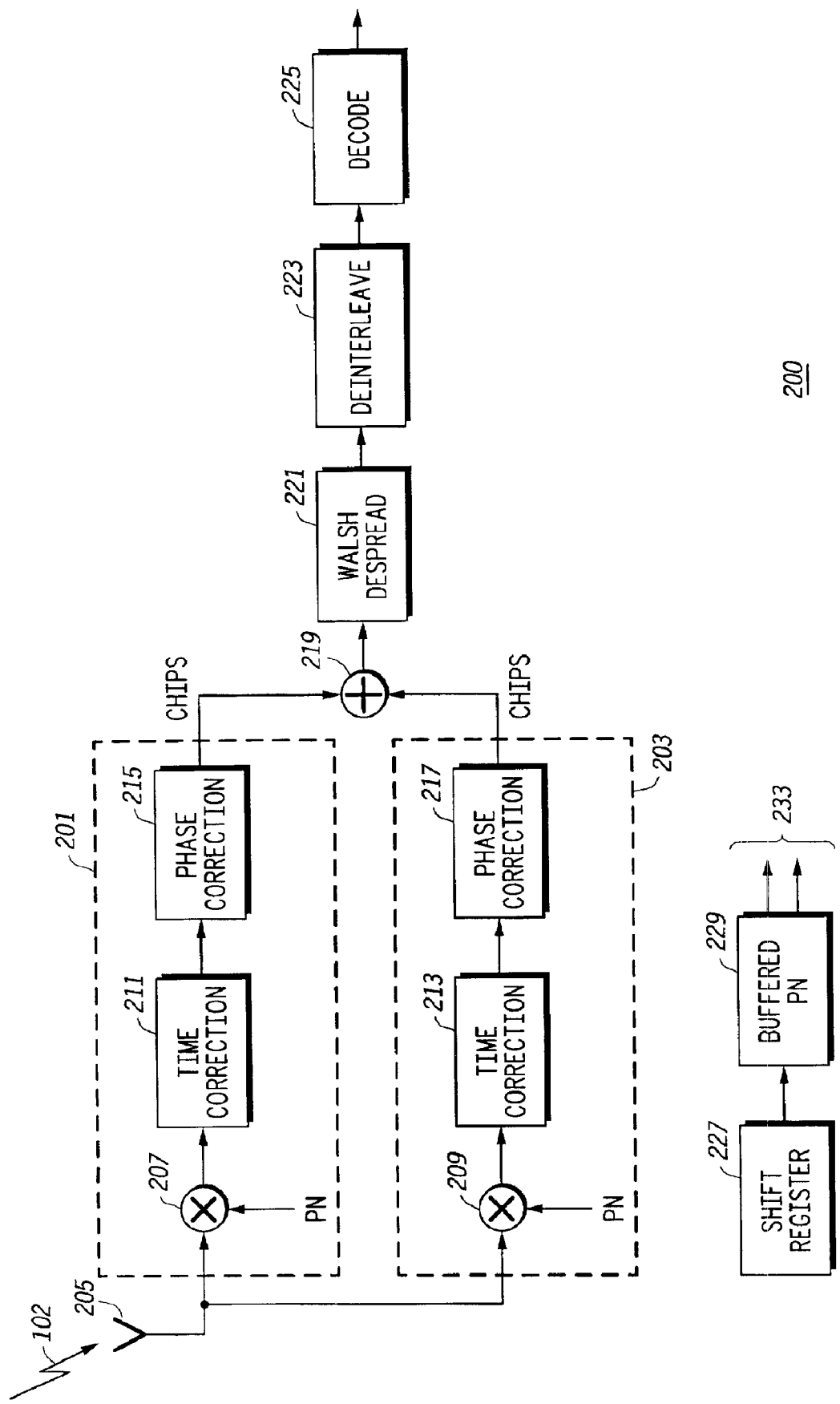
FIG. 2 is a block diagram of a receiver in accordance with the preferred embodiment of the present invention.

Turning now to the drawings, wherein like numerals designate like components, FIG. 2 is a block diagram of receiver 200 in accordance with the preferred embodiment of the present invention. As shown, receiver 200 comprises RAKE fingers 201 and 203, chip combiner 219, Walsh despreader 221, deinterleaver 223, decoder 225, shift register 227, and buffered PN sequence 229. One of ordinary skill in the art will recognize that receiver 200 may be implemented within cellular infrastructure equipment (e.g., a cellular base station) as well as cellular mobile units. Additionally, although FIG. 2 shows two multipath fingers (201, 203) existing within receiver 200, one of ordinary skill in the art will recognize that many multipath fingers may be simultaneously received.

Operation of receiver 200 in accordance with the preferred embodiment of the present invention occurs as follows: Signal 102, which has undergone multipath scattering, is received at antenna 205. The received signal is passed to RAKE fingers 201 and 203. An appropriate time-shifted PN sequence is applied to the received signal via despreaders 207 and 209 to produce a pair of chip streams at a particular chip rate (e.g., 1.228 Mchip/second). The chip streams are time corrected via circuitry 211 and 213. More particularly, because each multipath component of the received signal has taken a different path to antenna 205, each signal is time-shifted (skewed) a varying amount. In order to time correct the chip stream, each finger employs a time delay buffer. The delay of the chip stream from input to output through each buffer is set such that corresponding chips from each finger are output at the same time regardless of their time of input. Thus the skew between finger chip streams can be compensated by correctly adjusting and maintaining each delay buffer's input-to-output delay.

The time-corrected chip streams are then phase corrected via circuitry 215 and 217, resulting in two chip streams aligned in time and phase. More particularly, circuitry 215 and 217 analyze a reference pilot signal encoded within the chip stream to determine the phase error of each time corrected chip stream. Once the phase error is determined, phase correction circuitry 215 and 217 adjust each chip stream's phase to correspond to the reference phase. The output of RAKE fingers 201 and 203 is a chip stream for the received multipath components of signal 102. Each chip stream enters chip combiner 219, where combining takes place. Combiner 219 outputs a combined chip stream that is the combination of all multipath fingers received at antenna 205. The combined chip stream can be despread (via despreader 221) with the appropriate Walsh code (defining a particular channel). The resulting symbol stream can then be deinterleaved (via deinterleaver 223) and decoded (via decoder 225).

Figure 1:
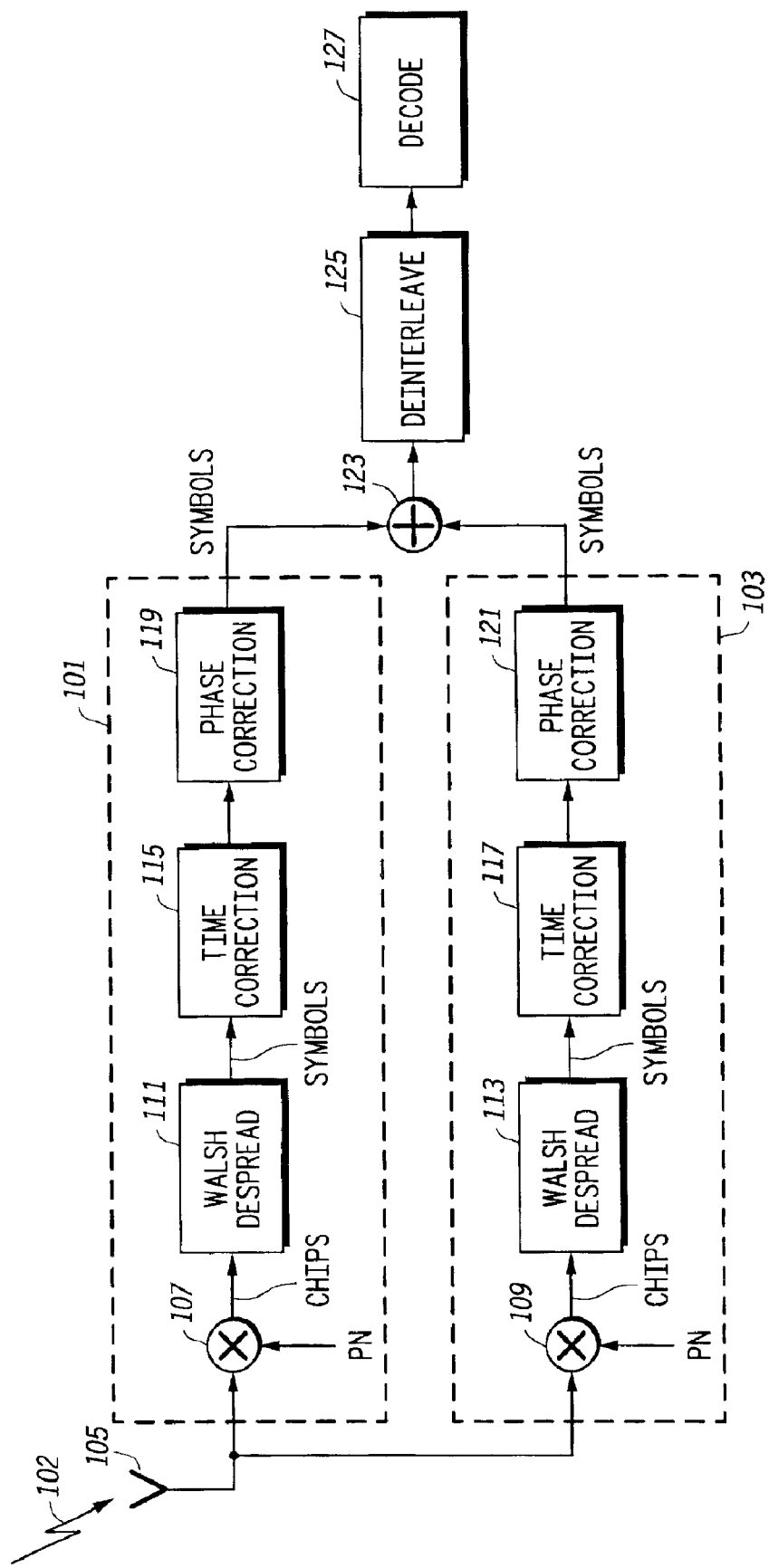
FIG. 1 is a block diagram of a prior-art receiver.

By combining multipath components of the transmitted signal at the chip level, no need exists for the complexities of combining at the symbol level. Therefore, the gains of diversity combining can be achieved for multipath signal reception without the need for symbol combining. This allows for a single time correction 211 and phase correction 215 per finger and a single depsreader 221 per Walsh channel, greatly reducing system complexity. In actuality the receiver of FIG. 1 typically processes eight channels, requiring 4×8 Walsh despreaders (four for each channel), 4×8 time correction circuits, and 4×8 phase correction circuits, while the receiver of FIG. 2 only requires 8 Walsh despreaders, 4 time correction circuits, and 4 phase correction circuits. Therefore, unlike prior art RAKE receivers that require, for each finger, a Walsh despreader per channel, a time correction per channel and a phase correction per channel, the preferred embodiment of the present invention requires, for each finger, a single time correction and a single phase correction and after combining all fingers, a Walsh despreader per channel, greatly reducing the complexity of the receiver.

Figure 3:
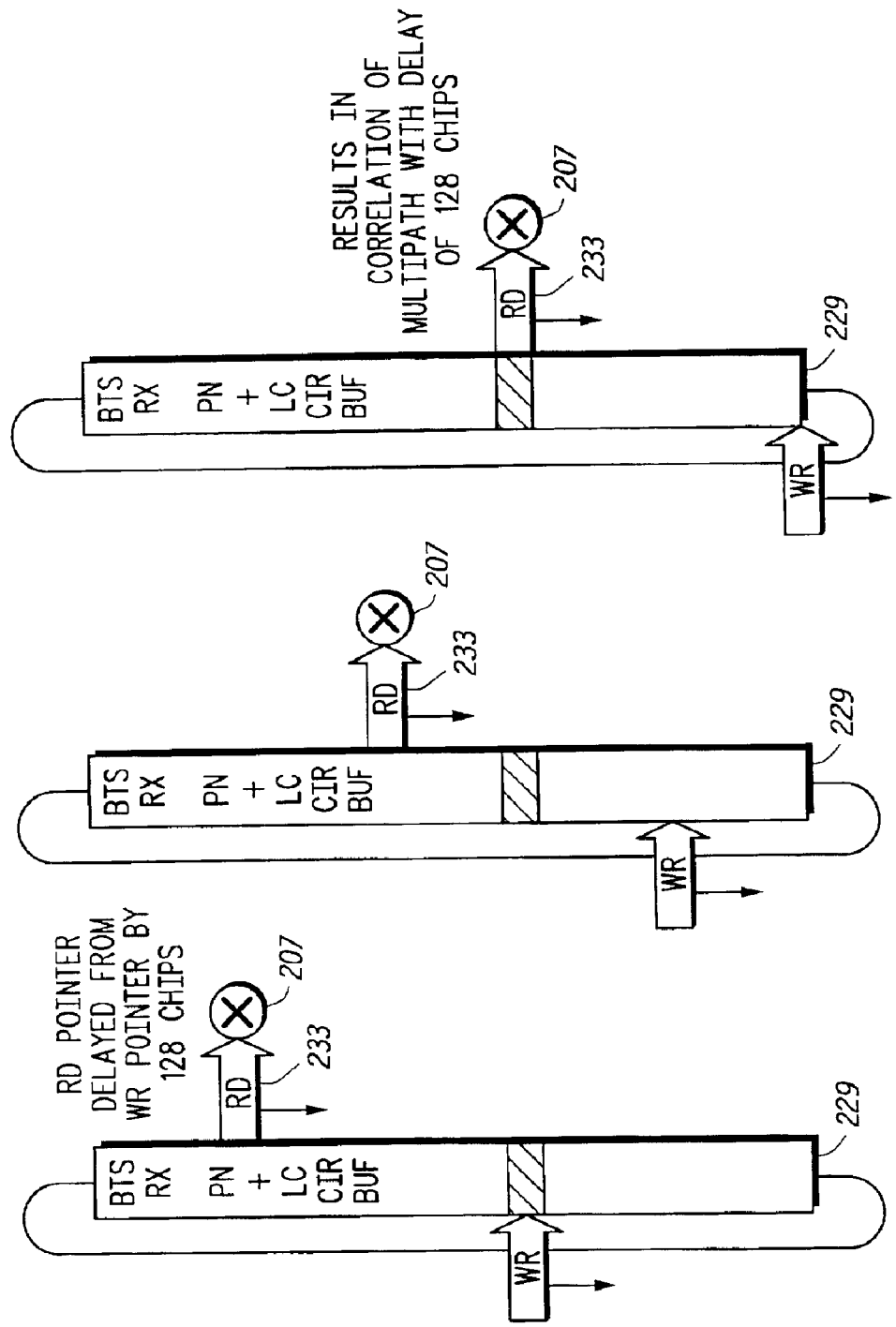
FIG. 3 illustrates a buffered PN sequence in accordance with the preferred embodiment of the present invention.

In accordance with the preferred embodiment of the present invention the PN sequences needed for PN despreading are generated from a single PN generator (implemented as shift register 227) combined with a multiport Random Access Memory (RAM) 229 configured as a circular buffer. This is illustrated in FIG. 3. RAM 229 has a single write port with an address counter running at a fixed rate based on system time. There exists one PN read port 233 per finger 201, 203. Each PN read port 233 has a PN state machine and address counter running at an offset from the write pointer, and thus, at a delay from system time corresponding to the multipath delay for that finger. For a general background on identification of multipath delays in communication systems, reference is made to "INTRODUCTION TO SPREAD-SPECTRUM ANTIMULTIPATH TECHNIQUES AND THEIR APPLICATION TO URBAN DIGITAL RADIO" by Turin, published in the Proceedings of the IEEE, Vol. 68, No. 3, March 1980.

Figure 4:
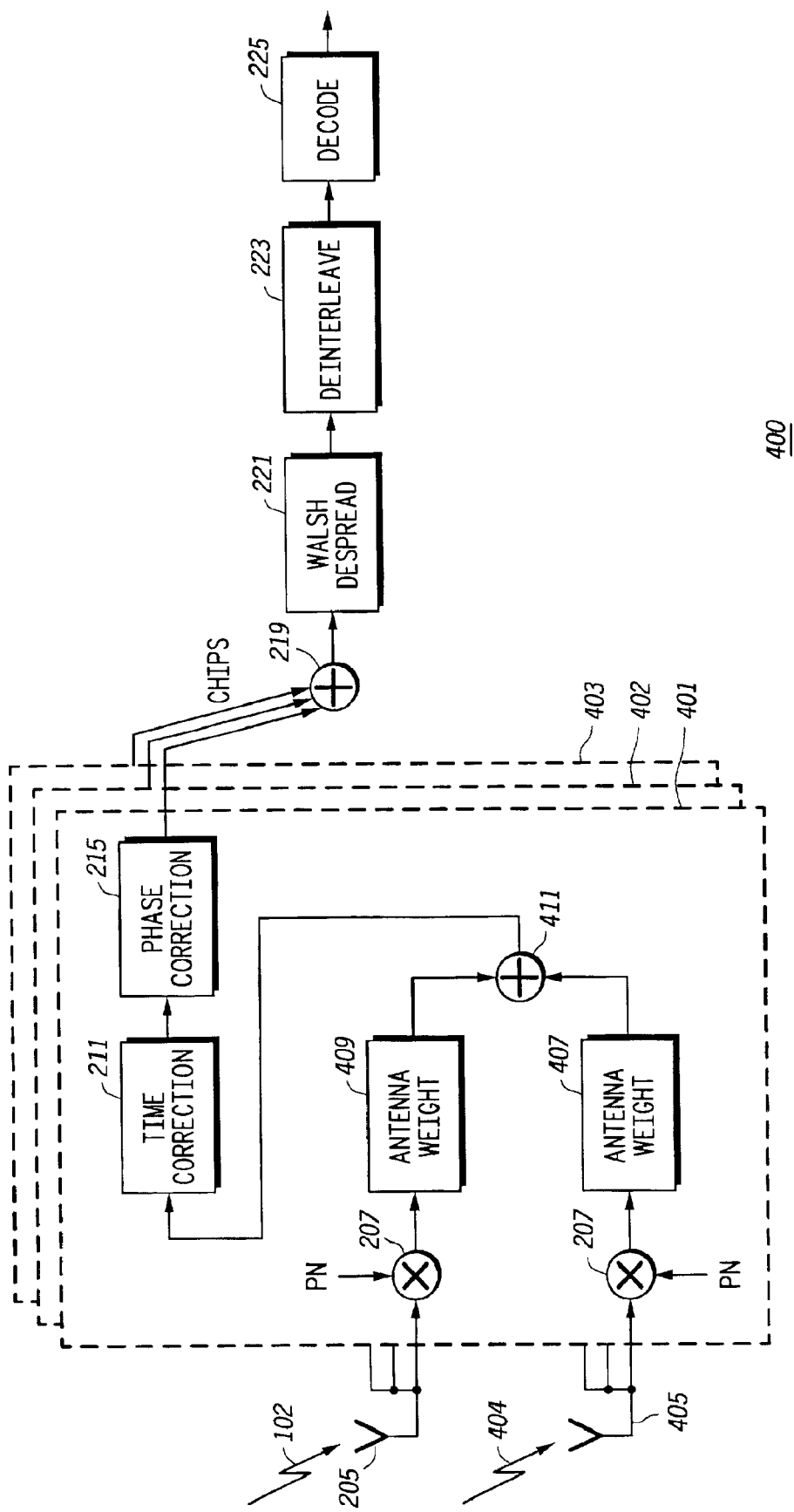
FIG. 4 is a block diagram of a receiver in accordance with an alternate embodiment of the present invention.

FIG. 4 is a block diagram of receiver 400 in accordance with an alternate embodiment of the present invention. In the alternate embodiment of the present invention multiple antennas 205 and 305 are utilized to receive and combine signal 102. The use of multiple antennas for combining purposes allows adaptive antenna techniques utilizing beamforming to be utilized with the preferred embodiment of the present invention.

As shown, receiver 400 comprises RAKE fingers 401–403, chip combiner 219, Walsh despreader 221, deinterleaver 223, decoder 225. Although not shown, shift register 227 and buffered PN sequence 229 are utilized as described above. Each finger 401–403 comprises multiple PN despreaders 207, multiple antenna weighting circuitry 407, 409, and antenna summer 411. One of ordinary skill in the art will recognize that receiver 400 may be implemented within cellular infrastructure equipment (e.g., a cellular base station) as well as cellular mobile units.

Operation of receiver 400 in accordance with the preferred embodiment of the present invention occurs as follows: Antennas 205 and 405 are in close proximity. Signal 102, which has undergone multipath scattering, is received at antenna 205. Similarly, signal 404, whose multipath components are similar to but differ in amplitude and phase from those of signal 102, is received at antenna 405. The received signals are passed to RAKE fingers 401–403. An appropriate time-shifted PN sequence is applied to each antenna's received signal via despreaders 207 to produce a pair of chip streams at a particular chip rate (e.g., 1.228 Mchip/second). Each chip stream is weighted via weighting circuitry 407–409. In particular, the chip stream from each antenna is multiplied by a value (weight) for that antenna to change that antenna signal's phase and amplitude in a predetermined manner. Thus the set of antenna signals is multiplied by a set of weights. Weighting allows multiple antennas to be combined such that received signals from a particular direction are favored (additive) or are rejected (subtractive). Such antenna arrays have reception patterns in the form of beams and nulls whose beam and null width, and direction with respect to the antenna array is a function of the set of weights. Beamforming using adaptive antenna techniques allows concentrating received energy from the desired direction (source) and rejecting interference from other directions thus improving the receiver performance.

After appropriate weighting, the chip streams from each antenna are combined via combining circuitry 411 and passed to time and phase correction circuitry 211–215. The chip streams are time corrected via circuitry 211, and the time-corrected chip stream is then phase corrected via circuitry 215, resulting in three chip streams aligned in time and phase. The output of RAKE fingers 401–403 is an antenna-combined chip stream for the received multipath components of signal 102 and signal 404. Each chip stream enters chip combiner 219, where combining takes place. Combiner 219 outputs a combined chip stream that is the combination of all multipath fingers received at antennas 205 and 405.

By combining multipath components of the transmitted signal at the chip level, no need exists for the complexities of combining at the symbol level. Therefore, the gains of diversity combining can be achieved for multipath signal reception without the need for symbol combining. This allows for a single time correction 211 and phase correction 215 per finger and a single depsreader 221 per Walsh channel, greatly reducing system complexity. More particularly, the combined chip stream can be despread (via despreader 221) with the appropriate Walsh code (defining a particular channel). The resulting symbol stream can then be deinterleaved (via deinterleaver 223) and decoded (via decoder 225). Therefore, unlike prior art RAKE receivers that require, for each finger, a Walsh despreader per channel, a time correction per channel and a phase correction per channel, the preferred embodiment of the present invention requires, for each finger, a single time correction and a single phase correction and after combining all fingers, a Walsh despreader per channel, greatly reducing the complexity of the receiver.

Figure 5:
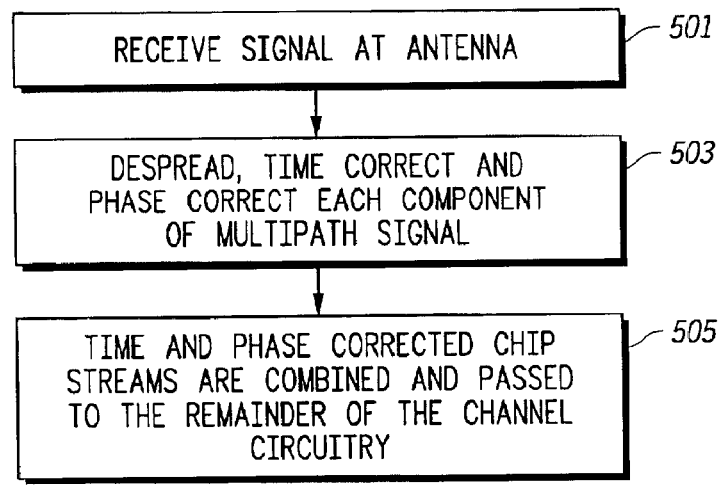
FIG. 5 is a flow chart showing operation of the receiver of FIG. 2 in accordance with the preferred embodiment of the present invention.

FIG. 5 is a flow chart showing operation of receiver 200 of FIG. 2 in accordance with the preferred embodiment of the present invention. The logic flow begins at step 501 where signal 102 is received at antenna 205. As discussed above, signal 102 comprises the actual signal along with a plurality of multipath reflections (copies) of the transmitted signal. Each component enters a signal path 201, 203, where it is despread, time corrected and phase corrected (step 503). In other words, a first signal is received at a first finger of receiver 200 and a second signal is received at a second finger of receiver 200. The first and the second signals are multipath reflections of a transmitted signal. Chip streams are generated and at step 505, a plurality of time and phase corrected chip streams are combined via combiner 219, and passed to the remainder of the channel circuitry (i.e., despreader 221, deinterleaver 223, . . . , etc.).

Figure 6:
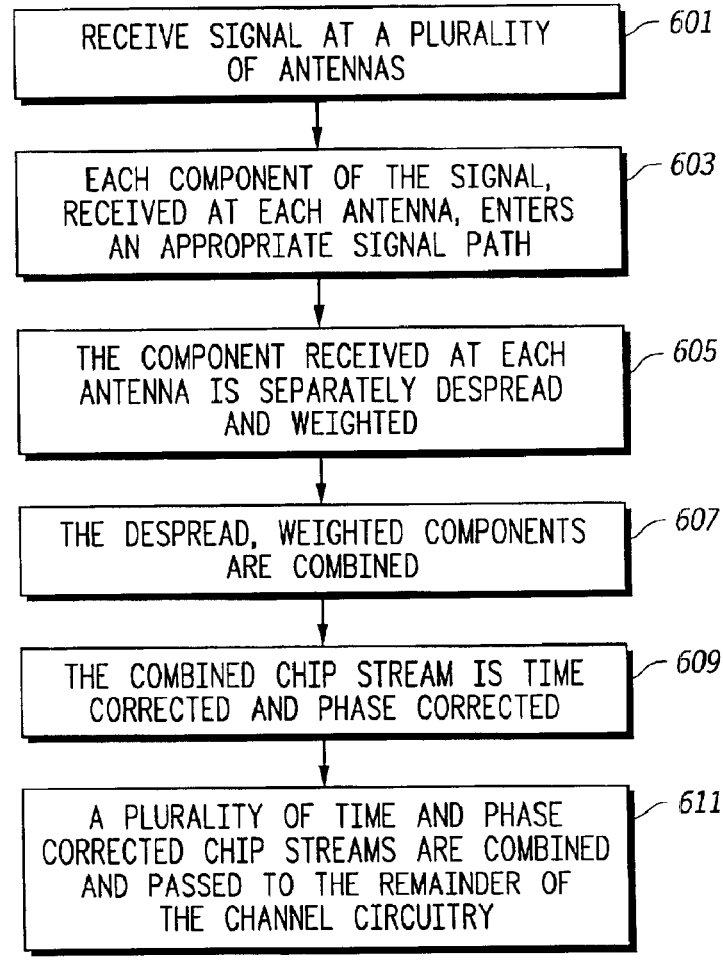
FIG. 6 is a flow chart showing operation of the receiver of FIG. 4 in accordance with the alternate embodiment of the present invention.

FIG. 6 is a flow chart showing operation of receiver 400 of FIG. 4 in accordance with the alternate embodiment of the present invention. As discussed above, the alternate embodiment provides for diversity benefits of adaptive antennas to be applied to chip combining. The logic flow begins at step 601 where signal 102 is received at antenna 205 and signal 404 is received at antenna 405. As discussed above, signals 102 and 404 comprise the actual signal and reflections (copies) of the transmitted signal (e.g., first and second reflection). Each component of the transmitted signal received at antennas 205 and 405 enters an appropriate signal path 401–403 at step 603. For example, a first component received at antenna 205 enters first, second, and third finger paths 401–403 of RAKE receiver 400, while a second component received at antenna 405 enters first, second, and third finger paths 401–403. The components received at each antenna 205 and 405 are then separately despread and weighted (step 605) and finally combined via combiner 411 (step 607). The combined chip stream is time corrected and phase corrected (step 609). At step 611, a plurality of time and phase corrected chip streams are combined via combiner 219, and passed to the remainder of the channel circuitry (i.e., despreader 221, deinterleaver 223, . . . , etc.).

As discussed above, by combining multipath components of the transmitted signal at the chip level, no need exists for the complexities of combining at the symbol level. Therefore, the gains of diversity combining can be achieved for multipath signal reception without the need for symbol combining. This allows for a single time correction 211 and phase correction 215 per finger and a single depsreader 221 per Walsh channel, greatly reducing system complexity. More particularly, the combined chip stream can be despread (via despreader 221) with the appropriate Walsh code (defining a particular channel). The resulting symbol stream can then be deinterleaved (via deinterleaver 223) and decoded (via decoder 225). Therefore, unlike prior art RAKE receivers that require, for each finger, a Walsh despreader per channel, a time correction per channel and a phase correction per channel, the preferred embodiment of the present invention requires, for each finger, a single time correction and a single phase correction and after combining all fingers, a Walsh despreader per channel, greatly reducing the complexity of the receiver.

Figure 7:
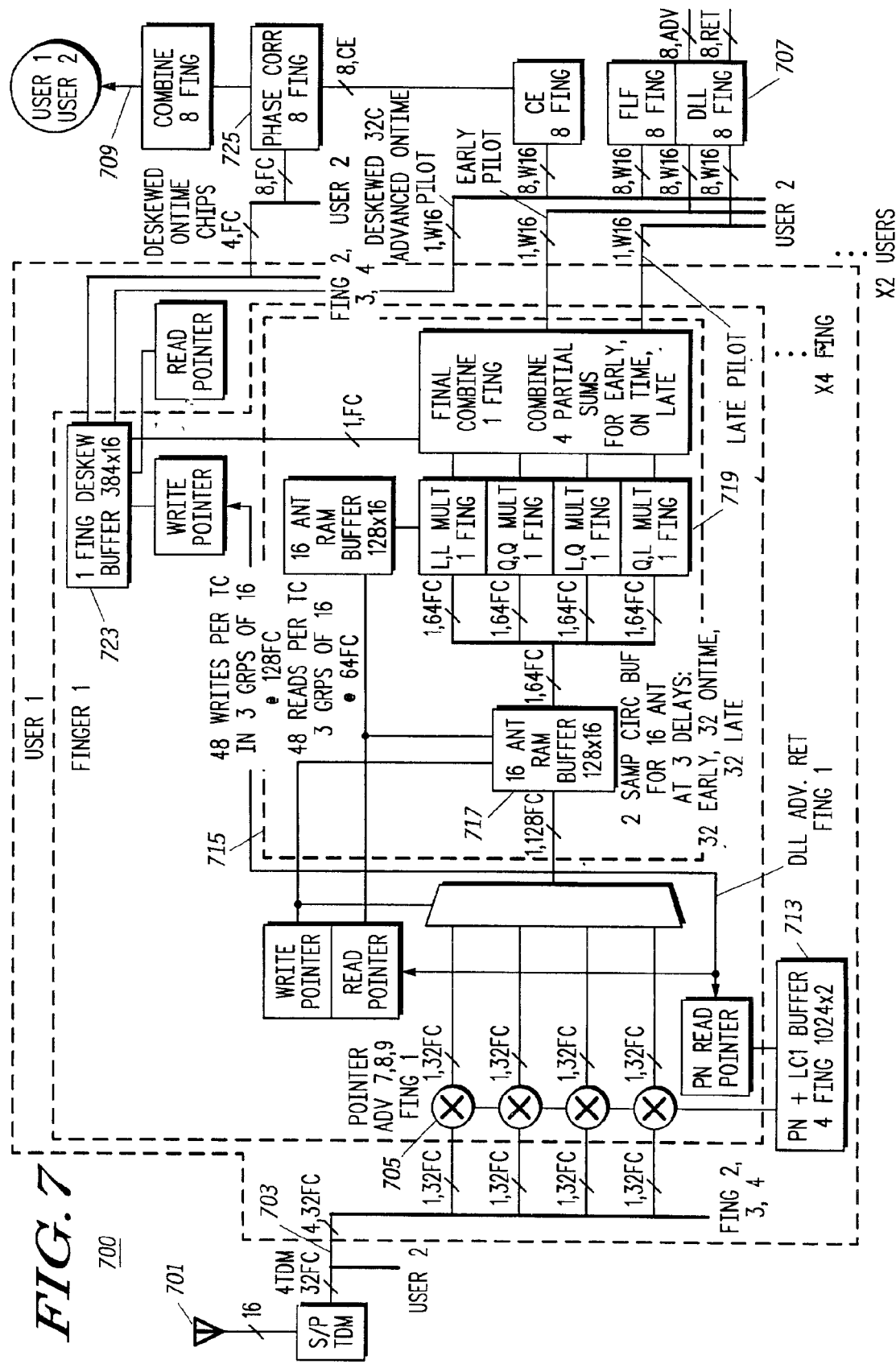
FIG. 7 is a block diagram showing implementation of both the preferred and alternate embodiments of the present invention.

FIG. 7 is a block diagram showing implementation of both the preferred and alternate embodiments of the present invention. In particular a functional block diagram of a third generation base station (BTS) receiver architecture combining the preferred and alternate embodiments is shown. Although details are shown for one finger only, receiver 700 processes 8 fingers with adaptive antenna array beam forming of 16 antennas per finger. The output is a chip rate data stream from the combining of 4 fingers ready for dewalshing (despreading) into multiple symbol streams. In this example 8 fingers are split into 2 groups of 4 fingers, one group per user for 2 users.

An array of 16 antennas 701 (Antenna) provides data samples at 8fc per antenna. Each antenna data consists of I-Q samples at 8× the chip rate (Antenna at 8fc). Sixteen sets of antenna samples are combined onto 4 TDM buses 703 for efficient distribution. Each TDM bus muxes 4 antenna samples per 8fc sample period (TDM at 32fc). Incoming TDM samples first go through PN despreading 705 for ¼ chip early (early), on-time and ¼ chip late (late) chips. The early and late chips are dewalshed into early and late pilot symbols used by the Delay Locked Loop (DLL) 707 for tracking. The on-time chips are the primary output 709 of the finger. The advantage of doing the PN despreading before the antenna weighting and combining is that it reduces processing by the antenna weight and combine operation from 512 multiplies per chip time to 192 multiplies per chip time. We weight and combine 3 samples out of 8; the early, on-time and late samples for each antenna, vs. weighting all 8 samples for all antennas and doing PN despreading afterwards. Since PN despreading occurs for all incoming samples, PN tracking of the multipath is simpler. A PN state machine both advances the PN sequence used for despreading and selects the 3 of 8 samples to be weighted.

As discussed above, the 4 PN sequences needed for 4 fingers are generated from a single PN generator combined with a multiport RAM 713 (PN+LC1 RAM) configured as a circular buffer. The PN+LC1 RAM has 1 write port with an address counter running at a fixed rate based on system time. There is a PN read port per finger. Each PN read port has a PN state machine and address counter running at an offset from the write pointer and thus at a delay from system time corresponding to the multipath delay for that finger. The read address counter also runs at an independent rate controlled by the DLL. The offset from system time can vary and thus the delay can vary to track the multipath.

The antenna weight and combine circuit 715 uses a buffer RAM 717 (16 Ant RAM Buffer) to store the 3 samples (per antenna) from the PN TDM bus that will be weighted. Four multipliers 719 are used in an efficient weight and combine operation. The weight circuit will process 3 groups of samples in sequence, early, on-time and late. Using 4 multipliers 719, each multiplier can efficiently do 1 of the 4 terms of the weight calculation and will sequence through the 16 antenna samples within a group. Combining the 4 terms and accumulating the 16 combined results gives the final output for that group. The advantage of configuring the multipliers this way is that this eliminates HW muxes in this high speed data path and simplifies the weight RAM interface—single read port vs. 4 read ports.

Finger deskew uses a 2 port RAM 723 (Deskew Buffer) per finger and will deskew the chip data from all 4 fingers. The write port has a address counter controlled by the PN read port address counter discussed above and thus tracks the finger offset (f_delay). The read port has an address counter at a fixed offset (ds_delay) from the PN write port address counter discussed above. The fixed offset is such that ds_delay will allow for an f_delay of up to 30 miles. Thus reading the Deskew Buffer will align the 4 fingers of chip data that became non-aligned due to different airinterface delay. The advantage of doing the deskew on the chip data vs. the symbol data is (for each finger) that deskewing at the chip eliminates redundant HW-1 deskew RAM access vs. several (=no. of walsh channels).

The chip rate channel corrector 725 uses the channel estimate derived from the received pilot and corrects each chip of the on-time data. The advantage of applying the channel correction to the chip data vs. applying it to the symbol data is (for each finger) is that this eliminates redundant HW-1 channel correction calculation vs. several (=no. of walsh channels).

While the invention has been particularly shown and described with reference to a particular embodiment, it will be understood by those skilled in the art that various changes in form and details may be made therein without departing from the spirit and scope of the invention. For example, It is intended that such changes come within the scope of the following claims.

What is claimed is:

1. A method for signal combining within a communication system, the method comprising the steps of:

receiving a first signal at a first finger of a receiver, receiving a second signal at a second finger of the receiver;

generating a first chip stream from the fist signal;

generating a second chip stream from the second signal;

combining the first and the second chip streams to produce a combined chip stream; and Walsh despreading the combined chip stream to produce a symbol stream.

2. The method of claim 1 wherein the step of generating the first chip stream comprises the step of utilizing a buffered PN sequence to generate the first chip stream.

3. The method of claim 2 wherein the step of generating the second chip stream comprises the step of utilizing the buffered PN sequence to generate the second chip stream.

4. The method of claim 1 further comprising the step of deinterleaving the symbol stream to produce a deinterleaved symbol stream.

5. The method of claim 4 further comprising the step of decoding the deinterleaved symbol stream.

6. The method of claim 1 further comprising the steps of:

receiving a third signal at the first finger of the receiver, wherein the first and the third signals are received at separate antennas;

despreading the first and third signals within the first finger of the receiver; and combining the first and the third despread signals to produce the first chip stream.

7. A method for signal combining, the method comprising the steps of:

receiving a first chip stream, wherein the first chip stream has been despread with a Pseudo Noise (PN) code;

receiving a second chip steam, wherein the second chip stream has been despread with the PN code;

combing the first and the second chip streams to produce a combined chip stream; and Walsh despreading the combined chip stream to produce a symbol stream.

8. The method of claim 7, wherein the step of receiving the first chip stream comprises the step of receiving the first chip stream output from a first finger of a receiver.

9. The method of claim 8 wherein the step of receiving the second chip stream comprises the step of receiving the second chip stream output from a second finger of the receiver.

10. The method of claim 7 further comprising the steps of:

deinterleaving the symbol strength to produce a deinterleaved symbol stream; and decoding the deinterleaved symbol stream.

11. A receiver comprising:

a first finger path having a first signal as an input and outputting a first chip stream;

a second finger path having a second signal as an input and outputting a second chip stream;

a chip combiner having the first and the second chip steam as an input and outputting a combined chip stream; and a Walsh despreader having the combined chip, stream as an input and outputting a symbol stream.

12. The receiver of claim 11 further comprising:

a deinterleaver having the symbol stream as an input and outputting a deinterleaved symbol stream; and a decoder having the deinterleaved symbol stream as an input and outputting a decoded symbol stream.

13. The receiver of claim 11 wherein the first finger path comprises:

a first despreader having a first antenna as an input, and outputting a first despread signal;

a second despreader having a second antenna as an input and outputting a second despread sigal; and a combiner having the first and the second despread signals as an input and outputting a combined chip stream.

14. The receiver of claim 11 wherein the first sign is a first multipath component of a received signal and the second signal is a second multipath signal of the received signal.

* * * * *